United States Patent
Jiang et al.

(10) Patent No.: US 6,539,353 B1
(45) Date of Patent: Mar. 25, 2003

(54) CONFIDENCE MEASURES USING SUB-WORD-DEPENDENT WEIGHTING OF SUB-WORD CONFIDENCE SCORES FOR ROBUST SPEECH RECOGNITION

(75) Inventors: Li Jiang, Redmond; Xuedong Huang, Woodinville, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/417,173

(22) Filed: Oct. 12, 1999

Related U.S. Application Data (60) Provisional application No. 60/109,157, filed on Nov. 20, 1999.

(51) Int. Cl.⁷ .............................................. G10L 15/14
(52) U.S. Cl. .................. 704/254; 704/252; 704/255
(58) Field of Search ............................... 704/252, 254, 704/255

(56) References Cited

U.S. PATENT DOCUMENTS

| | | | |
|---|---|---|---|
| RE31,188 E | | 3/1983 | Pirz et al. ................. 179/1 SD |
| 4,783,803 A | * | 11/1988 | Baker et al. ................ 704/252 |
| 4,797,929 A | | 1/1989 | Gerson et al. ................ 381/43 |
| 4,802,231 A | | 1/1989 | Davis ........................... 382/34 |
| 5,241,619 A | | 8/1993 | Schwartz et al. .............. 395/2 |
| 5,509,104 A | | 4/1996 | Lee et al. ................... 395/2.65 |
| 5,566,272 A | | 10/1996 | Brems et al. ................ 395/2.4 |
| 5,613,037 A | * | 3/1997 | Sukkar ....................... 704/256 |
| 5,625,748 A | | 4/1997 | McDonough et al. ........ 395/2.6 |
| 5,675,706 A | * | 10/1997 | Lee et al. .................... 704/256 |
| 5,677,990 A | | 10/1997 | Junqua ...................... 395/2.64 |
| 5,710,864 A | | 1/1998 | Juang et al. ................ 395/2.64 |
| 5,710,866 A | | 1/1998 | Alleva et al. .............. 395/2.65 |
| 5,712,957 A | | 1/1998 | Waibel et al. .............. 395/2.49 |
| 5,749,069 A | * | 5/1998 | Komori ...................... 704/240 |
| 5,797,123 A | * | 8/1998 | Chou et al. ................. 704/256 |
| 5,805,772 A | | 9/1998 | Chou et al. ................. 395/2.64 |
| 5,842,163 A | | 11/1998 | Weintraub ................... 704/240 |
| 5,937,384 A | * | 8/1999 | Huang et al. ............... 704/256 |
| 5,983,177 A | | 11/1999 | Wu et al. ................... 704/244 |
| 6,029,124 A | | 2/2000 | Gillick et al. .............. 704/200 |
| 2001/0018654 A1 | * | 8/2001 | Hon et al. .................. 704/257 |

OTHER PUBLICATIONS

Tatsuya Kawahara et al. "Combining Key–Phrase Detection and Subword–Based Verification for Flexible Speech Understanding," Proc. IEEE ICASSP 1997, vol. 2, p. 1159–1162, Apr. 1997.*

Tatsuya Kawahara et al. "Flexible Speech Understanding Based on Combined Key–Phrase Detection and Verification," IEEE Trans. on Speech and Audio Processing, vol. 6, No. 6, p. 558–568, Nov. 1998.*

Asadi, A. et al., "Automatic Modeling of Adding New Words to a Large–Vocabulary Continuous Speech Recognition System," in proc. of the *IEEE International Conference on Acoustics, Speech and Signal processing*, pp. 305–308 (1991).

(List continued on next page.)

*Primary Examiner*—Tālivaldis Ivars Šmits
(74) *Attorney, Agent, or Firm*—Theodore M. Magee; Westman, Champlin, Kelly, P.A.

(57) ABSTRACT

A method and apparatus is provided for speech recognition. The method and apparatus convert an analog speech signal into a digital signal and extract at least one feature from the digital signal. A hypothesis word string that consists of sub-word units is identified from the extracted feature. For each identified word, a word confidence measure is determined based on weighted confidence measure scores for each sub-word unit in the word. The weighted confidence measure scores are created by applying different weights to confidence scores associated with different sub-words of the hypothesis word.

18 Claims, 3 Drawing Sheets

OTHER PUBLICATIONS

Huang, X, et al., "Microsoft Windows Highly Intelligent Speech Recognizer: Whisper," In proc. of the *IEEE Interntional Conference on Acoustics, Speech and Signal Processing*, Detroit, pp. 93–96 (May 1995).

Sukkar, R. et al., "Utterance Verification of Keyword Strings Using Word–Based Minimum Verification Error (WB–MVE) Training", in proc. of the *IEEE International Conference on Acoustics, Speech and Signal Processing*, Atlanta, GA, pp. 518–521 (May 1996).

Rahim, M.G. et al., "Discriminative Utterance Verification Using Minimum String Verification Error (MSVE) Training," in proc. of the *IEEE International Conference on Acoustics, Speech and Signal Processing*, Atlanta, GA, pp. 3585–3588 (May 1996).

Eide, E. et al., "Understanding and Improving Speech Recognition Performance Through the Use of Diagnostic Tools," in proc. of the *IEEE International Conference on Acoustics, Speech and Signal Processing*, Detroit, pp. 221–224 (May 1995).

Chase, L., "Word and Acoustics Confidence Annotation for Large Vocabulary Speech Recognition," in proc. of the *European Conference on Speech Communication and Technology*, Rhodes, Greece, pp. 815–818 (Sep. 1997).

Schaaf T. et al., "Confidence Measures for Spontaneous Speech Recognition,"in proc. of the *IEEE International Conference on Acoustics, Speech and Signal Processing*, Munich, Germany,pp. 875–878 (May 1997).

Siu, M. et al., "Improved Estimation, Evaluation and Applications of Confidence Measures for Speech Recognition," in proc. of the *European Conference on Speech Communication and Technology*, Rhodes, Greece, pp. 831–834 (Sep. 1997).

Weintraub, M. et al., "Neural Network Based Measures of confidence for Word Recognition,"in proc. of the *IEEE International Conference on Acoustics, Speech and Signal Processing*, Munich, Germany, pp. 887–890 (May 1997).

Modi P. et al., "Discriminative Utterance Verificatin Using Multiple Confidence Measures," in proc. of the *European Conference on Speech Communication and Technology*, Rhodes, Greece, pp. 103–106 (Sep. 1997).

Rivlin, Z. et al., "A Phone–Dependent Confidence Measure for Utterance Rejection," in proc. of the *IEEE International Conference on Acoustics, Speech and Signal Processing*, Atlanta, GA, pp. 515–517 (May 1996).

Hwang, M.Y. et al., "Predicting Unseen Triphone with Senones," in proc. of the *IEEE International Conference on Acoustics, Speech and Signal Processing*, Minneapolis, MN, pp. 311–314 (Apr. 1993).

Alleva, F. et al., "Improvements on the Pronunciation Prefix Tree Search Organization,"in proc. of the *IEEE International Conference on Acoustics, Speech and Signal Processing*, Atlanta, GA, pp. 133–136 (May 1996).

Rohlicek et al., "Continuous Hidden Markov Modeling for Speaker–Independent Word Spotting", IEEE International Conference on Acoustics, Speech and Signal Processing, vol. 1, pp. 627–630, 1989.

Rose et al., "A Hiddeen Markov Model Based Keyword Recognition System[1]", IEEE International Conference on Acoustics, Speech and Signal Processing, vol. 1, pp. 129–132, 1990.

Alleva et al., "Confidence Measure and Their Application to Automatic Speech Recognition", IEEE Automatic Speech Recognition Workshop, (Snowbird, Utah), pp. 173–174, 1995.

Cox et al., "Confidence Measures for the Switchboard Database", IEEE International Conference on Acoustics, Speech and Signal Processing, vol. 1, pp. 511–514, 1996.

Jeanrenaud et al., "Large vocabulary Word Scoring as a Basis for Transciption Generation", Proceedings of Eurospeech, vol. 3, pp. 2149–2152, 1995.

Weintraub, "LVCSR Log–Likelihood Ration Scoring for Keyword Spotting", IEEE International Conference on Acoustics, Speech and Signal Processing, vol. 1, pp. 297–300, 1995.

Neti et al., "Word–Based Confidence Measures as a Guide for Stack Search in Speech Recognition", IEEE International Conference on Acoustics, Speech and Signal Processing, vol. 2, pp. 883–886, 1997.

Huang et al., "Microsoft Windows Highly Intelligent Speech Recognizer: Whisper", IEEE International Conference on Acoustics, Speech and Signal Processing, vol. 1, pp. 93–96, 1995.

Huang et al., "Whistler: A Trainable Text–to–Speech System", International Conference of Spoken Language Proceeding. vol. 4, pp. 2387–2390, 1995.

Chen et al., "Discriminative Training of High Perfromance Speech Recognizer Using N Best Candidates", IEEE, pp. 625–628, 1994.

A. Gunawardana et al., "Word–Based Acoustic Confidence Measures for Large–Vocabulary Speech Recognition", *Proceedings of the International Conference on Spoken Language Processing*, 1998.

\* cited by examiner

CONFIDENCE MEASURES USING SUB-WORD-DEPENDENT WEIGHTING OF SUB-WORD CONFIDENCE SCORES FOR ROBUST SPEECH RECOGNITION

REFERENCE TO RELATED APPLICATIONS

The present invention claims priority from a U.S. Provisional Application having Ser. No. 60/109,157, filed on Nov. 20, 1998, and entitled "CONFIDENCE MEASURE IN SPEECH RECOGNITION USING TRANSFORMATION ON SUB-WORD FEATURES."

BACKGROUND OF THE INVENTION

The present invention relates to speech recognition. In particular, the present invention relates to confidence measures in speech recognition.

In speech recognition systems, an- input speech signal is converted into words that represent the verbal content of the speech signal. This conversion is complicated by many factors including differences between speakers, inconsistent pronunciation by a single speaker and the inherent complexity of languages. Because of these complexities, speech recognition systems have been unable to recognize speech with one hundred percent accuracy.

In acknowledgement of this limited accuracy, many speech recognition systems include confidence measure modules that determine the likelihood that the speech recognition system has properly identified a particular word. For example, if a speech recognition system identifies a word as "PARK", the confidence measure indicates how likely it is that the word is actually "PARK" and not some similar word such as "PART" or "DARK".

Such confidence measures typically make decisions on a word level using word-level or sub-word level features. Because word-level features are usually task-dependent, it is difficult to use them outside of the speech recognition task they were designed for. Sub-word-level features, on the other hand, are more general and can be used for a variety of speech recognition tasks. Traditionally, sub-word features are used to generate sub-word confidence measures, which are averaged to derive an overall confidence measure for a word. For reasons discussed further below, such averaging is less than ideal for confidence measures. As such, an improved confidence measure is desired.

SUMMARY OF THE INVENTION

A method and apparatus is provided for speech recognition. The method and apparatus convert an analog speech signal into a digital signal and extract at least one feature from the digital signal. A hypothesis word string that consists of sub-word units is identified from the extracted feature. For each identified word, a word confidence measure is determined based on weighted confidence measure scores for each sub-word unit in the word. The weighted confidence measure scores are created by applying different weights to confidence scores associated with different sub-words of the hypothesis word.

In another aspect of the invention, the weights of the weighted confidence measure scores are determined using training data including speech waveform data and their transcriptions.

DETAILED DESCRIPTION OF ILLUSTRATIVE EMBODIMENTS

Figure 1:
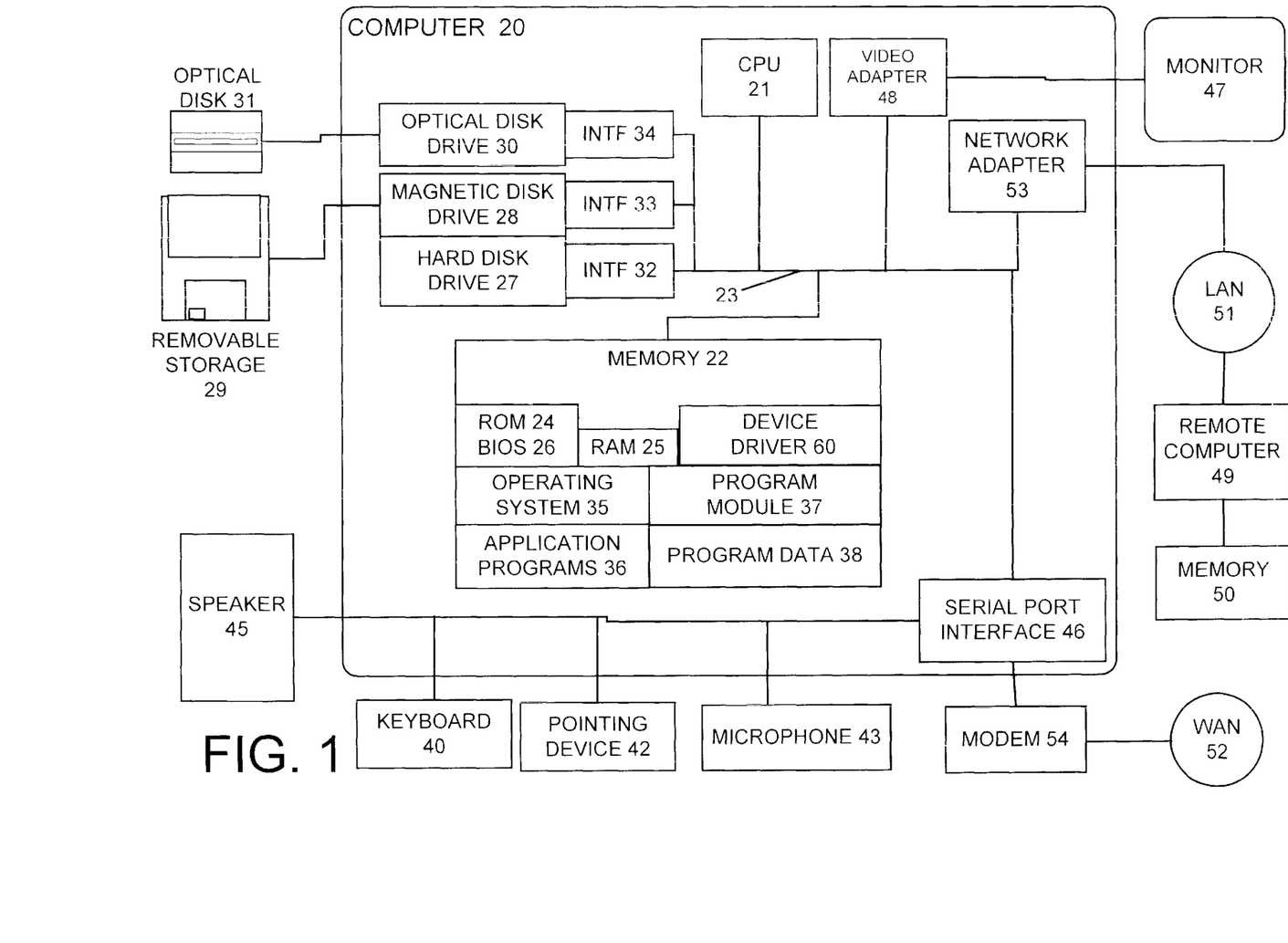
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory; storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS), 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer readable media provide nonvolatile storage of computer readable instructions, data structures, program modules and other data for. the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
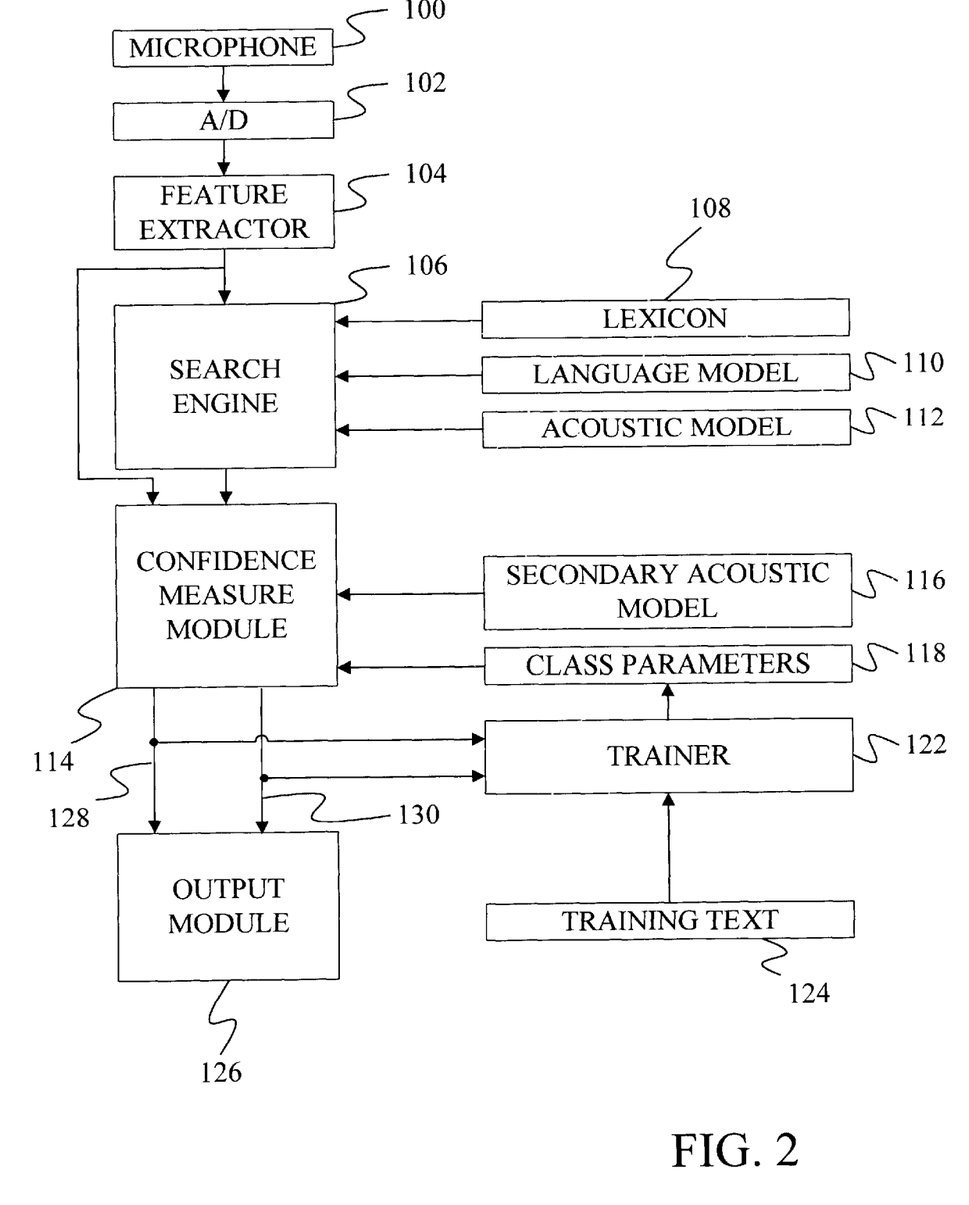
FIG. 2 is a block diagram of a speech recognition system of an embodiment of the present invention.

FIG. 2 provides a more detailed block diagram of modules of the general environment of FIG. 1 that are particularly relevant to the present invention. In FIG. 2, an input speech signal is converted into an electrical signal by a microphone 100, which is connected to an analog-to-digital (A-to-D) converter 102. A-to-D converter 102 converts the analog speech signal into a series of digital values. In several embodiments, A-to-D converter 102 samples the analog signal at 16 kHz thereby creating 16 kilobytes of speech data per second.

The digital data created by A-to-D converter 102 is provided to a feature extractor 104 that extracts one or more features of the digital speech signal. Such feature extraction is used to remove redundant data from the speech signal, to reduce the total amount of data provided to the speech recognizer and to isolate data that is particularly relevant to speech models used by the speech recognizer.

In one embodiment, feature extractor 104 divides the digital signal into 25 millisecond frames with 10 milliseconds overlap between consecutive frames. For each frame, feature extractor 104 calculates Mel-scale Cepstrum coefficients. This information is then taken as a feature vector, which may be further encoded using vector quantization and a codebook derived from training data.

The feature vectors (or codewords) are provided to a search engine 106, which identifies a most likely word sequence based on the feature vectors, an acoustic model 108, a language model 110, and a lexicon 112.

Acoustic model 108 provides a set of likelihoods that a series of feature vectors was created by a particular series of sub-words, such as a series of senones, phonemes, diphones, or triphones. In most cases the sub-word units are modeled as being context-dependent. Such context-dependence is inherent in triphone sub-word units, which treat the same phoneme in different left and right contexts as different units. Examples of acoustic model 108 include discrete, semi-continuous or continuous density Hidden Markov Models (HMM) that provide log likelihoods for any sequence of sub-words that can be generated by the lexicon for each series of feature vectors. In one embodiment, a set of HMMs with continuos-density output probabilities is used that consists of 3000 senones. A mixture of four Gaussian densities with diagonal covariances is used for each senone.

Language model 110 provides a set of likelihoods that a particular sequence of words will appear in the language of interest. In many embodiments, the language model is based on a speaker-independent database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model and the language model, search engine 106 generates an acoustic score and a language score for a set of words, which separately or together can be thought of as a speech score. Search engine 106 then selects the most probable sequence of words as a sequence of hypothesis words, which it provides at its output along with the acoustic scores and language scores associated with the hypothesis words. In one embodiment, search engine, 106 uses a pronunciation prefix tree to form a single pass decoder. The sharing in the tree can eliminate redundant computations for different words with the same prefix in pronunciation. In this embodiment, look ahead is also used for efficient pruning of the search space.

The sequence of hypothesis words and the acoustic and language scores associated with those words are provided to confidence measure module 114, which also receives the feature vectors produced by feature extractor 104.

In confidence measure modules of the prior art, a confidence measure was determined for each word identified by the speech recognizer by using a secondary acoustic model such as secondary acoustic model 116. Examples of such secondary acoustic models include "filler" models and "anti" models.

A filler model consists of a fully connected sub-word network such as a fully connected phone network. A filler sub-word model differs from the acoustic models used by the search engine in that the filler model is not limited to terms found in a lexicon. Under a filler model, any grouping of sub-words is possible, even if the grouping does not form a word from the lexicon. Filler models may be context-dependent or context-independent and may be searched using a Viterbi beam search.

In an anti model, each sub-word anti model is trained using data that includes every other sub-word except the sub-word being trained. Thus, if a segment has a low probability of matching the anti model for a trained sub-word, it is more likely that the segment was created by the trained sub-word.

Secondary acoustic models, such as the filler model or anti model, were used by the prior art to identify confidence scores for each sub-word in the hypothesis word identified by search engine 106. A word confidence score was then constructed by taking the average of the confidence scores of the sub-words. For example, the confidence score for each sub-word unit would be calculated by taking the log ratio of the acoustic score over the filler model score or anti model score for that sub-word. The confidence scores associated with each sub-word unit were then added together and the sum was divided by the number of sub-word units in the word to produce the word's confidence score.

Using this method, a word with a relatively low confidence score is generally identified as being improperly recognized. This most often occurs when the actual spoken term is not in the lexicon used by the search engine. In such cases, the search engine is forced to return an erroneous term as the hypothesis word because it is impossible for the search engine to return a word outside of its lexicon. In addition, since the correct term is not available to the search engine, the erroneous term as a generally low speech score. However, the actual spoken term is present in the all-phone network or anti model training data. This causes the erroneous term to have a relatively high filler model or anti model score. When the ratio of speech score against filler or anti model score. is taken, the ratio will be very low for the sub-word units in those out-of-vocabulary (OOV) words. Consequently, the confidence score for the OOV word will be low.

Because the prior art averages the confidence scores of each sub-word to form the confidence score for the word, it applies equal weighting to each sub-word. The present inventors have recognized that certain classes of sub-words are more important in properly identifying if a word is correctly recognized. By equally weighting each sub-word, the prior art ignores the significance of some sub-words.

To address this problem, the present inventors have designed a system for weighting different classes of sub-words differently when determining the confidence score (also referred to as a confidence measure) for a word based on a secondary speech model. Such weighting is viewed generically as:

$$CS(w) = \frac{1}{N} \sum_{i=1}^{N} f_{class(U_i)}(x_i)$$ EQ. 1 where CS(w) is the weight confidence score (also referred to as a confidence measure) for word w, $x_i$ is the confidence score for the ith sub-word unit in word w (for example, the log likelihood ratio of the speech score over a secondary acoustic model score), N is the number of sub-word units in w, "class($U_i$)" is class map function that maps the sub-word unit identifier $U_i$ for the ith sub-word unit to a class identifier, and $f_{class(U_i)}$ is the transform weighting function associated with the sub-word's class.

The confidence measure modules of the prior art can be described using Equation 1 by setting:

$$f_{class(U_i)}(x_i) = x_i$$ EQ. 2 for all i and all classes. Under the present invention, $f_{class(U_i)}$ is any number of more complex functions including but not limited to linear and quadratic functions. In a linear function:

$$f_{class(U_i)}(x_i) = ax_i + b$$ EQ. 3 where a and b are parameters chosen for each class and are the same for every sub-word within a class.

The classes can be chosen on numerous bases. In one embodiment of the invention, context-independent phonemes form the sub-word units and each class consists of a single phoneme. In other embodiments, the sub-word units are defined as triphones, with similar triphones grouped together into a common class.

Returning to FIG. 2, to calculate the confidence measure under the present invention, confidence module 114 first accesses the acoustic model scores produced by search engine 106 and secondary acoustic model 116 to produce a confidence score for each sub-word. For example, in one embodiment, this confidence score is the log likelihood ratio of the search engine's acoustic model score for the sub-word over the secondary acoustic model score for the sub-word. The sub-word confidence scores are then combined to produce a word confidence score using Equation 1 and a set of parameters associated with the transform weighting function of Equation 1. In FIG. 2, these -parameters are stored as class parameters 118 and include separate parameters for each class of sub-words.

If the confidence measure is below a threshold, the word is identified as likely being erroneous. If the value is above or equal to the threshold, the word is identified as likely being correct. The words 128 recognized by the speech recognizer, as well as the confidence measure 130 for each word are then provided to an output module 126, which further processes the hypothesis words. For example, output module 126 can notify the user that one or more words are likely incorrect so that the user may restate the utterance.

The confidence measure of Equation 1 may be augmented by including other confidence indications for sub-word units. For example, Equation 1 may be modified to:

$$CS(w) = \frac{1}{N} \sum_{i=1}^{N} f_{class(U_i)}(x_i, t_i)$$ EQ. 4 where $t_i$ is another confidence score for ith sub-word unit. For example, $x_i$ could be the ratio of speech score over filler model score and $t_i$ could be the ratio of speech score over an anti model score. Equation 4 could be extended to include more confidence indications (more than 2) for each sub-word unit. In Equation 4, $f_{class(U_i)}(x_i, t_i)$ can be any number of functions including but not limited to linear functions and quadratic functions. In one embodiment, it is a linear function of the form:

$$f_{class(U_i)}(x_i, t_i) = ax_i + bt_i + c$$ EQ. 5 where a, b and c are parameters that are chosen on a per class basis.

One aspect of the present invention is the ability to train the parameters of Equations 3 and 5 above. In one embodiment, discriminative training is used to identify the parameters for each class using a trainer 122 and training text 124. Trainer 122 receives the words recognized by search engine 106, the confidence measure for each word, and the actual word that was spoken from training text 124. Based on this information, trainer 122 adjusts the parameters in class parameters 118 through a process described below with reference to the flow diagram of FIG. 3.

Figure 3:
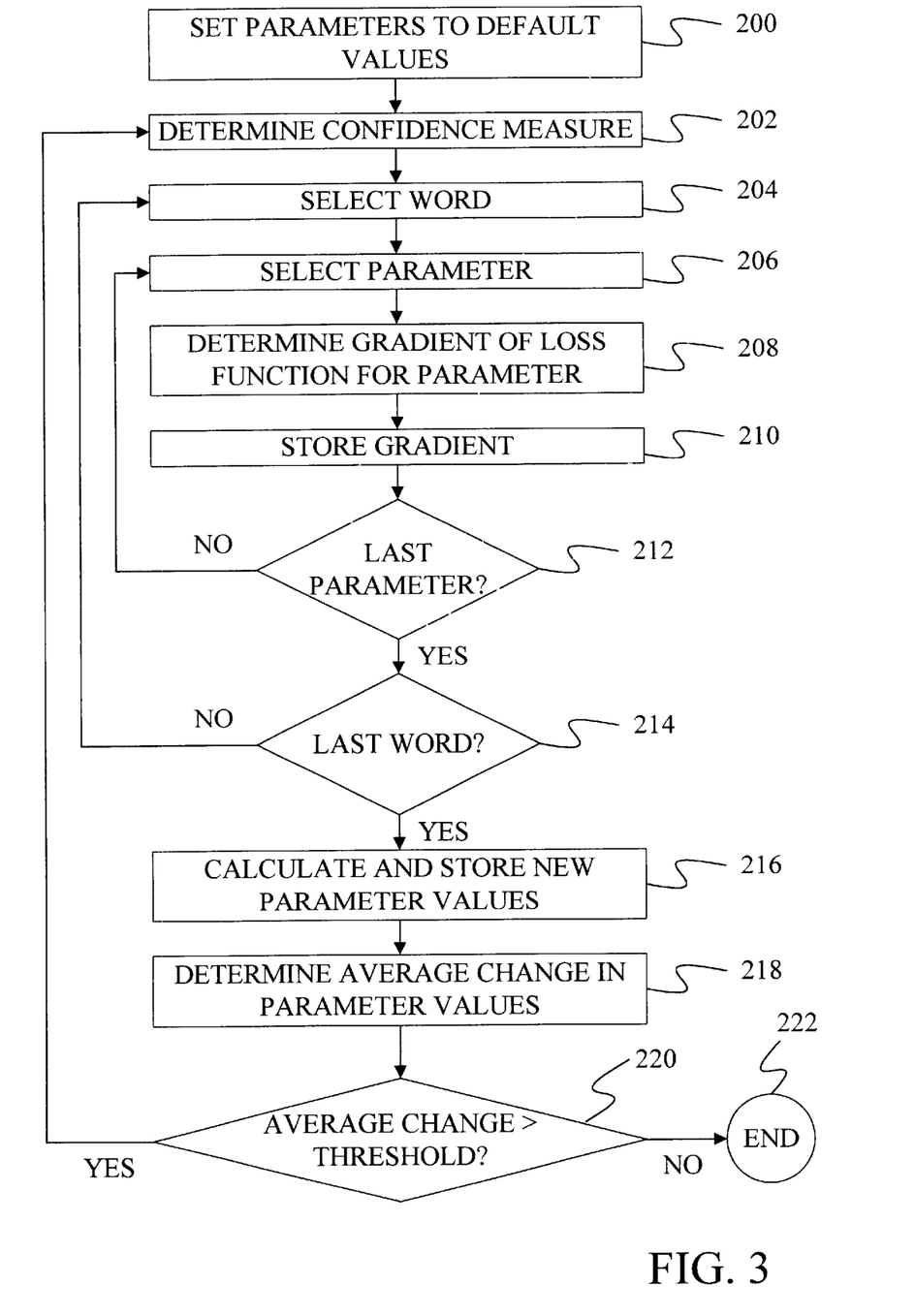
FIG. 3 is a flow diagram for training weights used in a confidence measure of one embodiment of the present invention.

In first step 200 of FIG. 3, trainer 122 sets the class parameters to default values (typically equal weights as default). In step 202, confidence measure module 114 uses the default parameter values to calculate confidence scores for a series of training words read from training text 124. These training words are read into microphone 100 and processed in the same manner as described above for normal speech recognition.

At step 204, the first word hypothesis provided by search engine 106 is selected and at step 206 the first parameter of the first sub-word is selected. For the selected parameter in the selected word, the gradient of a loss function is calculated at step 208. The loss function is generally a sigmoid function of the form:

$$l(y) = \frac{1}{1 + e^{-\gamma d(y)}} \qquad \text{EQ. 6}$$

where y is the transform weighting function, l(y) is the loss function, y is a constant, and d(y) is a cost function of the form:

$$d(y) = T - \frac{1}{N} \sum_{i=1}^{N} y_i \qquad \text{EQ. 7}$$

where T is a confidence measure threshold determined by training data to maximize the confidence measure performance, N is the number of sub-words in the current word, and y is the transform weighting function.

For a linear transform weighting function:

$$y = a_{ci} x_i + b_{ci} \qquad \text{EQ. 8}$$

where $a_{ci}$ and $b_{ci}$ are the class parameters associated with the ith sub-word $x_i$.

The gradient of the loss function of Equation 6 with regard to parameters a and b provides a value indicative of the amount a and b should be changed to achieve the optimal discrimination. The calculated gradient for the current parameter in the current word is stored at step 210.

At step 212, the process determines if this is the last parameter in the current word. If it is not the last parameter, the next parameter is selected by returning to step 206. Thus, for a linear transform weighting function, the first parameter would be the $a_{ci}$ parameter of the first sub-word and the next parameter would be the $b_{ci}$ parameter of the first sub-word. Steps 206, 208, and 210 repeat until a gradient has been determined for all of the parameters of the current word.

After a gradient for the last parameter of the current word has been stored, the process continues at step 214 where it determines if this is the last word in the training text. If this is not the last word, the next word is selected by returning to step 204. Steps 204, 206, 208, 210, 212 and 214 repeat until all of the words have been processed.

When the last word is reached at step 214, the process continues at step 216 where new parameter values are calculated using an update equation such as:

$$a(n+1) = a(n) - \text{lrate} \cdot \text{avg\_gradient}(a(n)) \qquad \text{EQ. 9}$$

where a(n+1) is the updated parameter value, a(n) is the current parameter value, lrate is a learning rate which is typically between 0.01 and 1, and avg_gradient (a(n)) is the average gradient of the current parameter across all words in the training text.

The average gradient value is calculated for each class parameter from the gradient values stored above. Thus, if a parameter appeared in connection with a number of different sub-words in the same class, the gradients associated with each of those appearances would be averaged. Similarly, if a parameter appeared in connection with the same sub-word in a number of different words, the different gradients associated with each of these appearances would be averaged together.

After the parameters have been updated, the updated parameters are stored in class parameters 118 for later use.

At step 218, the process determines the average change that occurred in the class parameters with the latest update. If the average change is above a chosen threshold at step 220, the process returns to step 202 where a new confidence measure is calculated using the updated parameters. Steps 202 through 220 are repeated until the average change in the parameters is below the threshold. When this occurs, the values of the parameters are considered sufficient and the process ends at step 222. Together, the steps of FIG. 3 represent the well-known gradient descent algorithm for training parameters.

In summary, under the present invention a confidence measure is determined that weights different sub-words differently to provide an improved confidence measure. In addition, under an aspect of the present invention, the weights are assigned to the different sub-words through a training process that automatically adjusts the weighting to improve the confidence measure.

Although the present invention has been described with reference to particular embodiments, workers skilled in the art will recognize that changes may be made in form and detail without departing from the spirit and scope of the invention.

What is claimed is:

1. A speech recognition system for identifying words from an input digital signal representing speech, the system comprising:
   a feature extractor for extracting at least one feature from the input digital signal;
   a search engine capable of identifying at least one hypothesis word and at least one speech recognizer score for a sub-word of the hypothesis word based on at least one feature and at least one speech model; and
   a confidence measure module capable of determining a confidence measure based in part on a confidence score for a sub-word of the hypothesis word, the confidence measure attributing different weights to confidences scores of different classes of sub-words in the hypothesis word.

2. The speech recognition system of claim 1 wherein attributing different weights to different sub-words comprises attributing different parameters to functions of a sub-word confidence score.

3. The speech recognition system of claim 2 wherein the functions are linear functions.

4. The speech recognition system of claim 2 wherein the functions are quadratic functions.

5. The speech recognition system of claim 2 further comprising a trainer for training the parameters of the functions.

6. The speech recognition system of claim 5 wherein the trainer uses a gradient descent algorithm to train the parameters.

7. The speech recognition system of claim 6 wherein the gradient descent algorithm is based on a loss function.

8. The speech recognition system of claim 6 wherein sub-words are assigned to classes such that sub-words within a class are weighted identically and wherein the gradient descent algorithm comprises updating each parameter of each class based on a respective gradient associated with each parameter.

9. A method of speech recognition comprising:
   extracting at least one feature from a set of digital values that represent a speech signal;
   identifying a hypothesis word formed of sub-words from the feature;
   determining sub-word confidence scores from the feature for each sub-word of the hypothesis word; and
   determining a word confidence score for the hypothesis word by-applying different weights to the sub-word confidence scores associated with different classes of sub-words of the hypothesis word.

10. The method of claim 9 wherein applying different weights to sub-word confidence scores comprises applying different parameters to functions of the sub-word confidence scores.

11. The method of claim 10 wherein applying different weights to sub-word confidence scores further comprises selecting the parameters for a class based on discriminative training.

12. The method of claim 11 wherein discriminative training comprises determining a gradient of a loss function for each parameter associated with a word.

13. The method of claim 12 wherein discriminative training further comprises updating each parameter on a pass through a training text, each parameter updated based on an average gradient of the loss function for the respective parameter across the training text.

14. The method of claim 9 wherein determining a sub-word confidence score comprises identifying a recognition acoustic model score for a sub-word and determining the ratio of the recognition acoustic model score over a secondary acoustic model score for the sub-word.

15. The method of claim 14 wherein determining a word confidence score further comprises weighting multiple confidence scores for each sub-word.

16. A computer-readable medium having computer executable instructions for performing steps comprising:
   receiving a digital signal representative of an input speech and noise signal;
   extracting features from the digital signal;
   identifying a recognition score from the features for a hypothesis word formed of sub-words; and
   determining a confidence score for the hypothesis word based on weighted sub-word confidence scores determined from the features, the weighting of sub-word confidence scores applying different weights to sub-word confidence scores associated with different classes of sub-words for the sub-words of the word.

17. The computer-readable medium of claim 16 wherein applying different weights to sub-word confidence scores comprises applying different parameters to functions of the sub-word confidence scores.

18. The computer-readable medium of claim 17 wherein applying different weights to sub-word confidence scores further comprises associating each sub-word with a class such that the functions of the sub-word confidence scores associated with sub-words within a class all have the same parameters.

* * * * *

UNITED STATES PATENT AND TRADEMARK OFFICE
CERTIFICATE OF CORRECTION

PATENT NO. : 6,539,353 B1
DATED : March 25, 2003
INVENTOR(S) : Jiang et al.

It is certified that error appears in the above-identified patent and that said Letters Patent is hereby corrected as shown below:

Column 2,
Line 56, after "for" delete ".".

Column 3,
Lines 33-34, remain one paragraph.

Column 5,
Line 36, replace "as" with -- has --.

Column 6,
Line 35, after "these" delete "-".
Line 55, replace "ti" with -- $t_i$ --.

Column 7,
Line 31, after "function," replace "y" with -- $\gamma$ --.

Column 8,
Replace Equation 9 with: -- $a(n+1) = a(n) - lrate \cdot avg\_gradient(a(n))$ --.

Column 9,
Line 25, after "by" delete "-".

Signed and Sealed this

Twenty-eighth Day of October, 2003

JAMES E. ROGAN
*Director of the United States Patent and Trademark Office*